United States Patent [19]

Doniwa

[11] Patent Number: 4,894,767

[45] Date of Patent: Jan. 16, 1990

[54] METHOD FOR YIELD TIGHTENING OF SCREWS

[75] Inventor: Tabito Doniwa, Hachioji, Japan

[73] Assignee: Daiichi Dentsu Kabushiki Kaisha, Chofu, Japan

[21] Appl. No.: 175,749

[22] Filed: Mar. 31, 1988

[51] Int. Cl.⁴ .................................................. G06F 15/00
[52] U.S. Cl. ..................................... 364/153; 173/12; 73/862.23; 73/862.24
[58] Field of Search ................... 364/153, 508; 73/761, 73/862.21, 862.23, 862.24; 29/407; 173/12

[56] References Cited

U.S. PATENT DOCUMENTS

| | | | |
|---|---|---|---|
| 4,008,773 | 2/1977 | Wallace et al. | 173/12 |
| 4,104,779 | 8/1978 | Sigmund | 29/407 |
| 4,400,785 | 8/1983 | Wallace et al. | 364/508 |

Primary Examiner—Allen MacDonald
Attorney, Agent, or Firm—Emmanuel J. Lobato; Robert E. Burns

[57] ABSTRACT

A method for yield tightening of screws by use of a wrench including a device for detecting a tightening torque in the actual tightening process, a device for detecting a tightening angle and an electric motor for applying a torque to each screw, a device for driving the wrench, and a controller including a device for communication with an external device. After the actual tightening torque reaches a certain value, an average torque rate is obtained by an integration using four or more pieces of torque data and is compared with a preset target torque rate, judging a yield point. The integration is performed for each minimum angle for which new torque data can be obtained. The tightening process is stopped when the judgement of the yield point has been given in succession a larger number of times than ½ of the number of torque data used for the integration. Further, a value obtained by subtracting a certain value from the actual tightening angle is integrated and the area of a right triangle inscribed in the area of the integrated value is obtained. The tightening process is stopped also when a difference between the integrated value and the area of the right triangle is greater than an area calculated using a preset target angle.

8 Claims, 8 Drawing Sheets

METHOD FOR YIELD TIGHTENING OF SCREWS

BACKGROUND OF THE INVENTION

The present invention relates to a method for yield tightening of screws to tighten a screw up to the maximum of elastic stress of the screw.

In the field of screw tightening, attention is now being focused on what is called a yield tightening method which tightens a screw up to the maximum of elastic stress of the screw itself, and there is also a growing tendency toward wide application of the method in the actual production line.

A physical phenomenon commonly called yield refers to a phenomenon that as external tensile force is applied to, for example, a rodlike object of metal, the external force and the elongation of the object are proportional to each other in the elastic area but in the plastic area only the elongation of the object increases although the external force does not substantially increase. In graphical terms, letting the external tensile force be represented on the ordinate and the elongation of the rod-like object on the abscissa, the external tensile force shows a linear locus at a fixed angle of inclination to the abscissa in the elastic area but in the plastic area it shows a locus almost parallel to the abscissa at a very small angle thereto. The same phenomenon is observed in screw tightening as well. Letting the angle of rotation of the screw be represented on the abscissa and the tightening torque on the ordinate, the torque locus is very close to the locus of the external tensile force mentioned above. This phenomenon has long been known in the art and a variety of methods have been proposed for its application to screw tightening in the actual production process.

Since the yield tightening method permits tightening screws with tension maximal to their elastic stress, as referred to above, the method is advantageous over a conventional method which tightens screws within a sufficiently safe range in the elastic area, such as a so-called torque tightening method, in that screws of a smaller cross-sectional area could be used if they are tightened with the same tension as in the above method and that the number of screws used could be reduced if their cross-sectional area is the same as in the above method. Since almost all industrial products have blocks or parts assembled together through screw tightening, it would bring about a considerable advantage in practice if the screw size or the number of screws used could be decreased by use of the yield tightening method.

However, many difficulties are encountered in actual applications of this yield tightening method. Theoretically, a point of refraction on the torque locus is surely a yield point, but it is very difficult to correctly find it out on an actual torque curve.

SUMMARY OF THE INVENTION

The present invention is intended to fulfil the above most important requirement for yield tightening and hance ensure the detection of the actual yield point including unknown factors, on the basis of a novel concept basically different from the prior art and through use of novel logical expressions and methods of analysis.

An object of the present invention is to provide a method of analysis for detecting the actual yield point which is the prime essential to the yield tightening.

To attain the above object of the present invention, a method is proposed for yield tightening of screws by use of a wrench including a device for detecting a tightening torque in the actual tightening process, a device for detecting a tightening angle and an electric motor for applying a torque to each screw, a device for driving the wrench, and a controller including a device for communication with an external device. After the actual tightening torque reaches a certain value, an average torque rate is obtained by an integration using four or more pieces of torque data and is compared with a preset target torque rate, judging a yield point. The integration is performed for each minimum angle for which new torque data can be obtained. The tightening process is stopped when the judgement of the yield point has been given in succession a larger number of times than ½ of the number of torque data used for the integration. Further, a value obtained by substrating a certain value from the actual tightening angle is integrated and the area of a right triangle inscribed in the area of the integrated value is obtained. The tightening process is stopped also when the difference between the integrated value and the area of the right triangle is greater than an area calculated using a preset target angle.

BRIEF DESCRIPTION OF THE DRAWINGS

The present invention will be described in detail below with reference to the accompanying drawings, in which.

DETAILED DESCRIPTION

To readily understand the present invention, the principle of an actual screw tightening will first be described. To look for the yield point calls for two dimensions of the tightening torque applied to the screw and the tightening angle thereof. As is well-known in the art, a torque transducer for detecting the tightening torque applied to the screw and an angle encoder for detecting the tightening angle of the screw are mounted on a wrench which applies the tightening torque, and these devices convert detected values into electric signals for application to electronic circuits.

Figure 1:
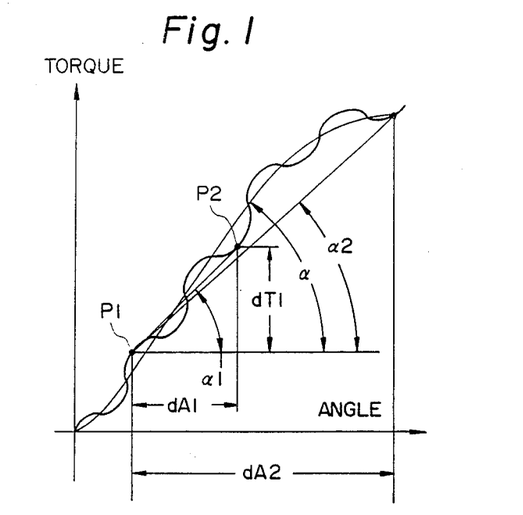
FIG. 1 is a graph of an example of an actual fluctuated torque curve obtained in screw tightening.

In the actual screw tightening process, the actual torque curve will be produced in such a complicated wavy form as shown in FIG. 1 under the influence of surface roughnesses of the contact surfaces of screw threads and the contact surface of the screw head with a member to be tightened, the influence of a dynamic vibration which is produced when the wrench applies the tightening torque to the screw, and the influence of electric noise which is generated when the above-mentioned devices output the detected values after amplifying them. For implementing the yield tightening, it is necessary to find out the point of refraction where the actual torque curve leaves the elastic area and enters the plastic area. This means the necessity of obtaining the angle of inclination of the actual torque curve.

Generally speaking, two points on the torque locus are joined by a straight line and then the angle of inclination of the straight line is obtained.

In FIG. 1, letting the angle of inclination between points P1 and P2 and the increment torque and the increment angle between them be represented by $\alpha 1$, $dT1$ and $dA1$, respectively, the angle $\alpha 1$ is given as follows:

$$\alpha 1 = dT1/dA1$$

This angle $\alpha 1$ is commonly referred to as the torque rate.

In a case where the actual torque curve has such a complicated wavy form as depicted in FIG. 1, however, a serious error will occur between the actual average torque and the calculated torque rate "$\alpha 1$" according to the sample position where to obtain the angle of inclination. To reduce this error, the increment angle "$dA1$" on the abscissa must be selected large. However, where the increment angle is selected extremely large as indicated by "$dA2$", even if the torque rate at terminating end portion of the actual torque curve is so small that this portion is almost parallel to the abscissa, the calculated torque rate "$\alpha 2$" will not become so small compared with that "$\alpha$", as shown in FIG. 1. Therefore, the increment angle cannot be chosen so small nor can it be selected so large.

The angle of inclination is usually obtained by the use of what is called a differentiation method, but this method of calculation is not suitable for use in connection with such a complicated curve as depicted in FIG. 1.

Figure 2:
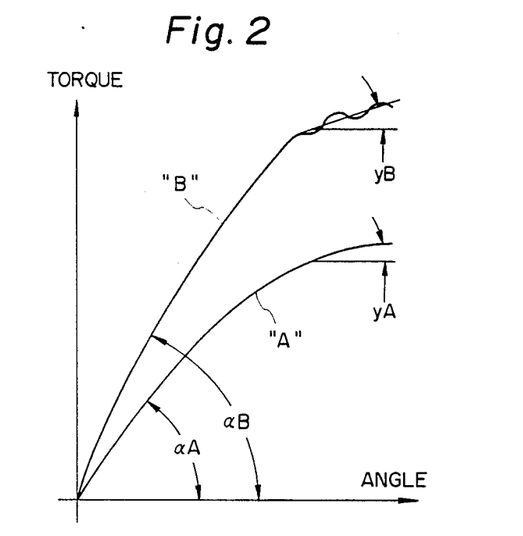
FIG. 2 is a graph which illustrates actual torque curves explanatory of the boundary region between the elastic area and the plastic area in screw tightening.

Furthermore, the locus of the actual torque curve in the boundary region between the elastic and plastic areas may sometimes be gentle over a wide range, as indicated by a curve "A" in FIG. 2, and in some cases it may have such a complicated refraction area as indicated by a curve "B". It is very difficult to find out actual yield points on such curves, with accuracy and with certainty. With a view to over-coming the defect of the above-mentioned method of calculation, some yield tightening methods have been proposed, according to which high and low torque limits are set to the actual tightening torque, high and low angle limits are set to the actual tightening angle, an acceptable area called a green area is set using these limits, and at the end of the actual tightening process check is made to determine whether the two tightening values stay within the acceptable area, thereby preventing an erroneous detection of the yield point.

However, the actual tightening torque and the actual tightening angle are not directly related to the yield point and the limits to these values are totally auxiliary and merely expedient measures. The first basic requirement of the yield tightening method is to detect the actual yield point as accurately as possible. Accordingly, if little importance is attached to this, then no reliable yield tightening could not be achieved, whatever indirect methods may be used for remedying the above-mentioned drawback.

In view of the above principle of the actual screw tightening process, the present invention will now be described.

As referred to previously, the actual torque curve inevitably takes a complex wavy form under the influences of various factors. The measurement of the angle of inclination of the torque locus between two point thereon, i.e. the calculation of the torque rate, for judging the inclination of the locus will not only suffer an error between the calculated torque rate and the actual average one but also lead to a misjudgement.

In the torque rate calculating technique according to the present invention it is a first requirement to obtain the average torque rate from four or more pieces of torque data.

In the screw tightening process the torque curve in the elastic area is almost straight and its angle of inclination, i.e. its torque rate is dependent on the configurations and physical properties of the screw used and the member to be tightened. In the plastic area the torque curve is nearly parallel to the abscissa, and accordingly the torque rate is close to zero. In the boundary region between the elastic and plastic areas may vary gently in some cases and may change so abruptly in some cases that points of refraction can clearly be discerned. Moreover, a known method proposes a technique which detects the yield point by determining how much the torque rate and the actual torque rate have changed in the elastic area. According to this method, however, if the rate used as the criterion for the yield point is selected small, then there will be a fear of stopping the tightening process before the final yield point is reached, whereas when the rate is selected large, if the torque rate in the elastic area is small, the torque rate which is used as the criterion in the plastic area will become negative, introducing the possibility of tightening the screw to the end of the plastic area. This method is incompatible with the concept of quality control regarded as important in recent years.

The ultimate object of the present invention resides in quality control of yield tightening of screws. To attain this object, the present invention offers a reliable yield tightening method which is free from unstability and uncertainty in the detection of the yield point which has limited wide application of yield tightening although it superiority has been recognized in the art. To this end, the refractive index of the torque curve is not used as the criterion for the yield point but a preset yield torque rate is employed as a target value of the criterion. This is based on a theory that the torque curve in the plastic area becomes nearly horizontal regardless of the torque rate in the elastic area. This is a second requirement of the present invention.

In the calculating process according to the present invention, after the actual tightening process has proceeded to the rotation angle where the next new piece of torque data can be obtained, the new torque data is included in the calculation and the oldest torque data is removed from the calculation. By this, the calculating process can proceed while exchanging torque data one by one no matter how many pieces of data may be included in the calculation. This is a third requirement of the present invention.

In this instance, if the whole torque data is exchanged for each calculation, no judgement can be made during the tightening process until a rotation angle is reached where the next whole torque data to be calculated can be obtained; namely, a dead zone is provided. Since the accuracy of stoppage of the tightening process is maintained by stopping the process upon issuance of a stop command, the presence of the dead zone itself impairs the accuracy of stopping the process. The third requirement of the present invention is aimed at obviating this showtcoming.

In general, single screw tightening is extremely rare and multiple screw tightening takes place in almost all cases. In case of tightening a plurality of screws to fasten one member to another, the torque curve of the respective screw often contains spike-shaped undulations superimposed on its peculiar wavy locus under the influence of tightening of the other screws. The occurrence of this abnormal undulation provides the same result of calculation as if the yield point has been reached. When this phenomenon occurs relatively early in the tightening process, the final tightening angle and tightening torque go out of the aforementioned acceptable area referred to as a green area, and consequently this phenomenon can be dealt with as an error. However, when this phenomenon occurs near the actual yield point, it is impossible, with the above-said technique alone, to detect the actual yield point. To avoid this, the torque rate is calculated by a predetermined number of times and only when the AND operation of the results of calculations is YES, it is judged that the actual yield point has been reached. The number of calculations necessary for this judgement needs to be larger than ½ of the number of data to be calculated. This is a fourth requirement of the present invention.

In the basic theory the torque curve in the plastic area is nearly horizontal or flat, but this is seen only when the coefficient of friction inherent to the screw is always constant. In practice, the torque locus in the plastic area may remain extremely flat in some cases and tend to rise at a certain angle of inclination in some cases. The latter indicates that the coefficient of friction increases little by little as the tightening angle increases. In this instance, it is feared that the actual torque rate will not become smaller than the preset target torque rate, introducing the possibility of misjudging that the calculating process has not reached the yield point yet; namely, the tightening process cannot be stopped. A reliable device is needed for preventing this over-tightening. According to a method which is used in the present invention therefor, after the actual tightening process has reached one preset torque limit, a value obtained by substracting the preset torque value from the actual torque value is integrated as the tightening process proceeds, the area of a rightangles triangle inscribed in the integrated area is obtained, and when the difference area has exceeded a certain value, the tightening process is brought to an emergency stop.

The emergency stop of the tightening process by this method is approximately equivalent to stopping the process when the screw is tightened a certain angle after the actual yield point was reached. This is a fifth requirement of the present invention.

The above-described requirements are indispenable for establishing quality control of the yield tightening procedure. By fulfilling these five requirements in parallel with the progress of the tightening process, reliable quality control of the yield tightening can be achieved.

The ultimate object of the present invention resides in highly reliable quality control of the yield tightening, with a view to promoting the introduction of the yield tightening technique into the wide field of screw tightening.

A detailed description will be given first of the first requirement of the present invention. The defect of the conventional calculating method using torque data at two points on an unsmooth torque locus, for obtaining accurate average torque data, has been described previously in connection with FIG. 1. To clarify the superiority of the calculating technique of the present invention over the prior art method, an analysis will be made of an effect which would be produced by further inclusion of the differentiation of torque data between the above-said two points on the torque locus. Since this method includes torque data at many points on the torque locus as shown in FIG. 3, it seems that an average value very close to the true value can be obtained.

Figure 3:
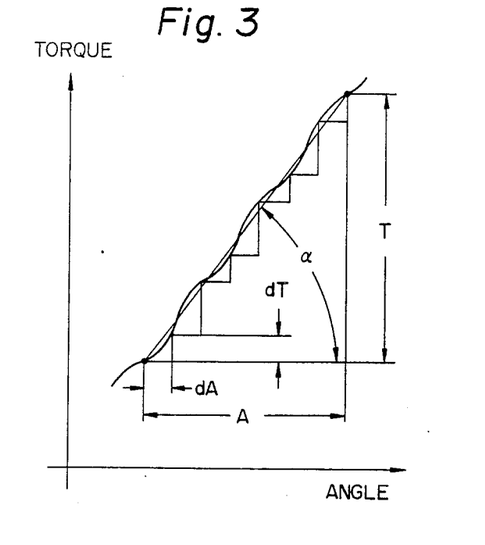
FIG. 3 is a graph which illustrates actual torque curves explanatory of obtaining an average torque rate using an integration method.

In FIG. 3, letting the average torque rate be represented by $\alpha$, it can be obtained as follows:

$$\alpha = \Sigma(dT/dA)/n \tag{1}$$

Further, the above can be modified as follows:

$$\begin{aligned} \alpha &= [(\Sigma dT)/dA]/n \\ &= \Sigma dT/dA \cdot n \end{aligned} \tag{2}$$

In FIG. 1, however, since it can be defined that $\Sigma dT = T$ and $dA \cdot n$, substitution of these values into equation (2) gives $$\alpha = T/A.$$

Thus, the result of calculation in this case is the same as in the case of merely calculating torque data at the start point and the end point on the torque locus, and the both methods suffer the same calculation error for such a torque locus as depicted in FIG. 1.

Since the first requirement of the present invention is to use a method of obtaining the average torque rate by integrating four or more pieces of torque data, a value approximately close to the actual average torque value can be obtained. An equation for obtaining the average torque value is as follows:

$$\alpha = 4 \left[ \sum_{n}^{(n/2)+1} dT - \sum_{n/2}^{1} dT \right] / n^2 \quad (3)$$

Figure 4:
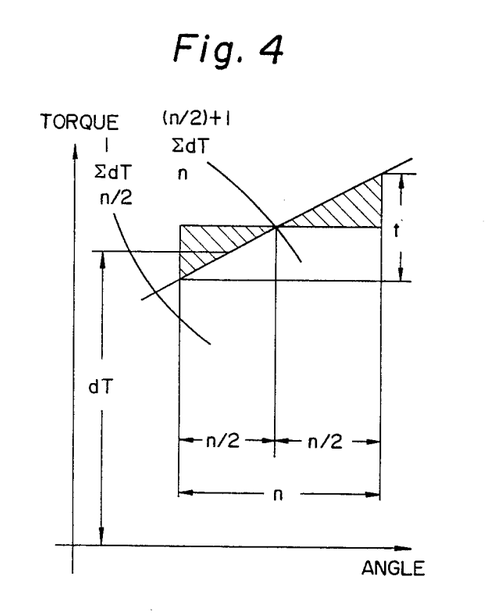
FIG. 4 illustrates a torque/angle graph explanatory of obtaining a torque rate in accordance with the principle of the present invention.

The principle of this equation will be described with reference to FIG. 4. The ordinate represents the actual tightening torque, the torque value at each point thereon being represented by dT, and the abscissa represents the tightening angle. The torque value is processed for each minimum resolution of the tightening angle. Let the number of torque value data to be preset be represented by n. The number n needs to be an even number not less than 4. Dividing a region containing n pieces of torque data into two, respective integrated values of their areas are such as indicated in FIG. 4. In order to obtain the average torque value, the torque locus in this region must be regarded as linear. A difference in area between the right-and left-hand regions is equal to the sum total of the areas of the hatched portions. Quadrupling the total area and dividing it by the number n, an increment t of the torque is obtained. Further dividing it by the number n, the average torque rate in this region can be obtained. This is the logical contents of equation (3). When the direction of inclination of the locus is reverse from the direction in FIG. 4, the answer of equation (3) is negative.

Figure 5:
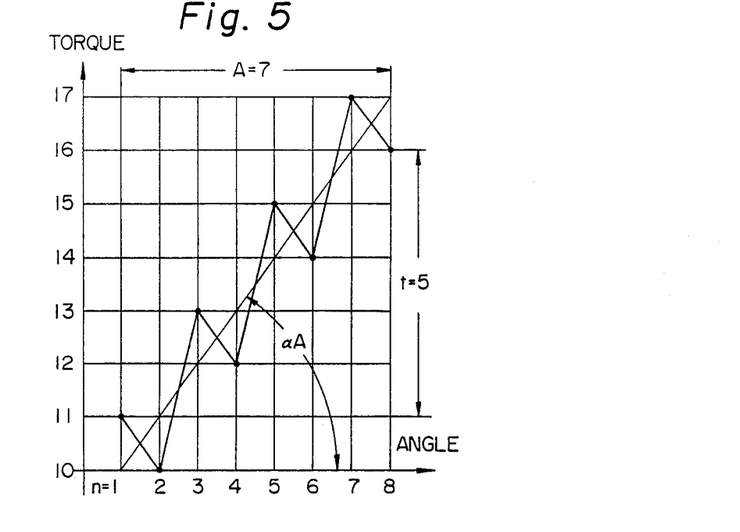
FIG. 5 illustrates a torque/angle graph explanatory of differences between the present invention and prior art.

Turning now to FIG. 5, it will be described that the method using equation (3) is superior to the conventional differentiation method. A value obtainable with the differentiation method is as follows:

$$\alpha = t/A = 5/7 = 0.7142857.$$

This value has an error of about 30% because the actual torque rate $\alpha A$ is 1. According to equation (3), $$\alpha = 4[(15+14+17+16)-(11+10+13+12)]/8^2 = 4(-62-46)/64 = 1$$

This is a correct answer. Since equation (3) uses all data in the area of calculation, a value close to the true one can be obtained regardless of the shape of the actual torque curve.

Next, the second requirement of the present invention will be described in detail. A description will be given first of the relationship between the tightening angle and the tightening torque.

Letting the tightening torque, the tightening angle, the coefficient of friction of the screw and the stress of the screw be represented by T, $\theta$, $\mu$ and $\sigma$, respectively, the tightening torque T can be given by the following approximate expression:

$$\sigma \simeq K1 \cdot \theta \quad (4)$$
$$T \simeq K2 \cdot \mu \cdot \sigma$$

where K1 and K2 are constants.

If the constant K2 and the coefficient of friction $\mu$ are constant, then the tightening torque T and the stress of the screw $\sigma$ are in direct proportion to each other and the stress of the screw $\sigma$ is in direct proportion to the tightening angle $\theta$ as well. This means that the tightening torque T and the tightening angle $\theta$ are in direct proportion to each. other. However, the stress of the screw $\sigma$ has a limit and does not exceed a certain value. This is called to have entered the plastic area or yielded area.

When the stress of the screw $\sigma$ does not increase after having reached its limit, it becomes unrelated to the tightening angle $\theta$, and consequently the tightening torque T will not increase no matter how much the tightening angle $\theta$ increase. However, this is a theoretical conclusion, and in practice the torque rate in the plastic area may somewhat increase in some cases, as indicated by yA and yB in FIG. 2. Judging from the relations between $\alpha$A and yA and between $\alpha$B and yB in FIG. 2, it seems as if the torque rate in the elastic area and the torque rate in the plastic area are in proportion to each other. An analysis of a large quantity of actually sample data shows $$a(A) = yA, \ yB \ a(B) = yA/\alpha A, \ yB/\alpha B$$

where $a$ is a standard deviation of the torque rate.

The value $a(A)$ is apparently smaller than the value $a(B)$. This indicates that the yielded torque rate in the plastic area is not in proportion to the torque rate in the elastic area and has a fixed deviation independently of the latter.

In many known methods, however, the torque rate in the elastic area is used as a reference value for judging the yield torque rate.

Figure 6:
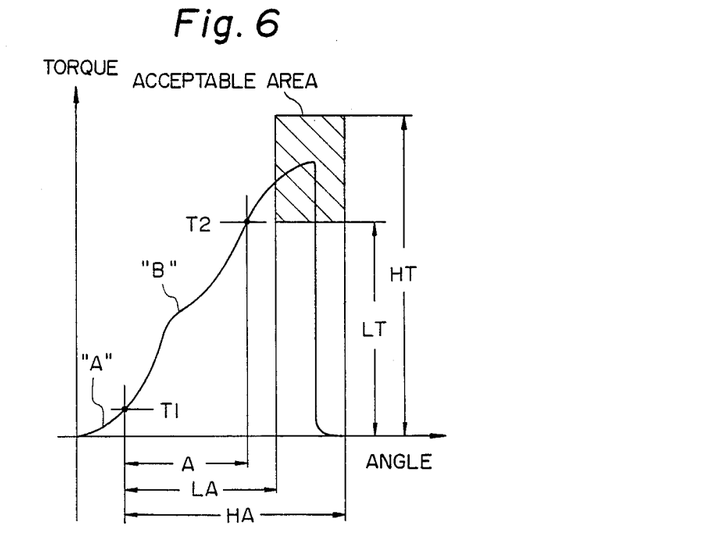
FIG. 6 illustrates a graph explanatory of an acceptable area enclosed by torque limits and angle limits on an actual torque curve.

This is based on the fact that the yield torque rate is always smaller than the torque rate in the elastic area, and is intended to prevent erroneous presentting of the target value for judging the yield torque rate. In practice, however, the torque locus in the elastic area is not only smooth as shown in FIG. 2 but also complicated as shown in FIG. 6. A region "A" on the curve in FIG. 6 shows a process in which unparallel contact surfaces of members to be fastened together are brought close to each other by bending moment, and a region "B" occurs in a case where very small protrusions of the contact surfaces or chips of metal still remaining thereon undergo plastic deformation by plastic stress applied thereto during the tightening process. It is extremely difficult to accurately calculate the torque rate between points T1 and T2 on the torque curve containing these regions. The torque curve is not rare but often seen in the actual production line. Working tolerances are always defined for every work-piece and errors in its surface roughness and parallelism are never zero; therefore, such a torque curve as shown in FIG. 6, though in varying degrees, naturally exists. The concept of utilizing the torque rate in the elastic area for judging the yield torque rate is based on the assumption that the torque curve in the elastic area is straight, but this concept is apparently wrong because a curve from which an accurate torque rate cannot be calculated is inevitably involved in the judgement of the yield torque rate.

The portion "B" in FIG. 6 is a false yielding condition, and if the judgement of the yield torque rate is started at the point T1, then the portion "B" will be judged as the yield point.

Accordingly, in order to judge the yield torque rate with certainty, it is necessary to start the judgement at a point where the torque is as high as possible, for example, at the point T2 in FIG. 6, and the target torque value must be a fixed preset value in view of the aforementioned theoretical and statistic conclusions.

Next, the third requirement of the present invention will be described in detail.

The first requirement of the present invention is to obtain the average torque rate by the integration using at least four pieces of torque data, as referred to previously. Each torque data are stored for each angle corresponding to the minimum resolution of the tightening angle. Accordingly, the spacing of the individual pieces of torque data is the minimum unit of the tightening angle. Letting the number of pieces of data to be integrated be represented by n, the minimum unit of the tightening angle is n−1. If the number of pieces of data for each integration is n, then the angle range by each calculation is n−1. If each calculation is performed using entirely new data different from that used in the previous calculation, then the calculation becomes possible after the tightening angle proceeds through n−1. That is, the integration is performed only at points P1 to P4 at intervals n−1 in FIG. 7. Assuming that the minimum resolution of the angle is 1° and the number of pieces of data is 20, the integration is performed at intervals n−1=19° alone.

Figure 7:
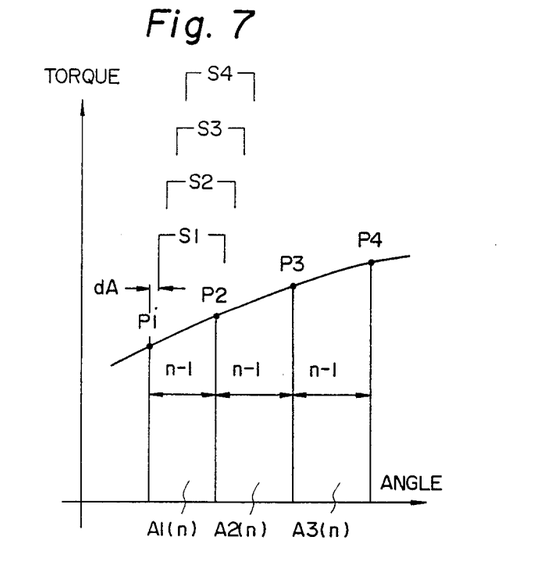
FIG. 7 is a graph of a torque/angle curve explanatory of integration operations according to prior art.

The third requirement of the present invention is intended to obviate the above defect. According to the present invention, the actual average torque rate $\alpha$ is calculated at the time point where the actual tightening process has reached the point P2, and if the calculated actual average torque rate is not smaller than the preset target torque rate, then the actual average torque rate is calculated again for the region "S1" immediately after the actual tightening process has proceeded by the minimum resolution dA of the angle. Thereafter the actual average torque rate is calculated for regions "S2" to "S4" one after another until the afore-mentioned condition is fulfilled.

Figure 8:
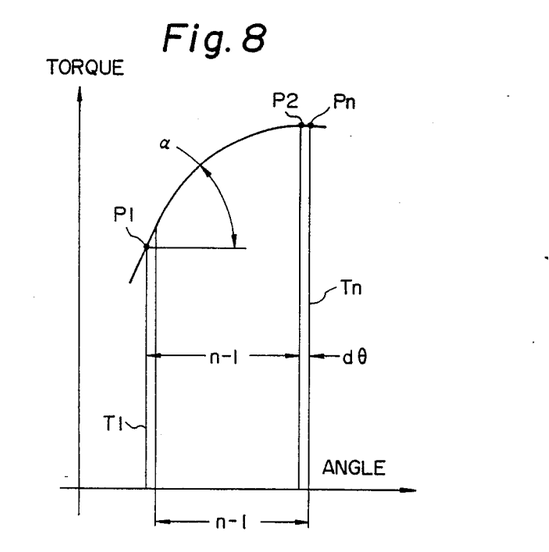
FIG. 8 is a graph of a torque/angle curve explanatory of sequences of integration calculations according to the present invention.

The actual calculating process will be described with reference to FIG. 8. At first, the actual average torque rate is calculated in a region of the angle n−1 from the point "P1" to "P2". If the calculated value is not smaller than the preset target torque rate, then torque data T1 is omitted from a data area of a microprocessor for the calculation, and when the tightening process has reached a point "Pn", new torque data "Tn" is added to the data area of the microprocessor and the actual average torque rate $\alpha$ is newly calculated. In this way, the calculating process is repeated for each resolution unit $d\theta$ of angle regardless of the number n of pieces of the torque data.

Next, the fourth requirement of the present invention will be described in detail. As referred to previously, screw tightening is multiple screw tightening in almost all cases. In these cases, the torque and tension of each screw are always subject to the influence of the tightening condition of other screws disposed adjacent thereto.

Figure 9:
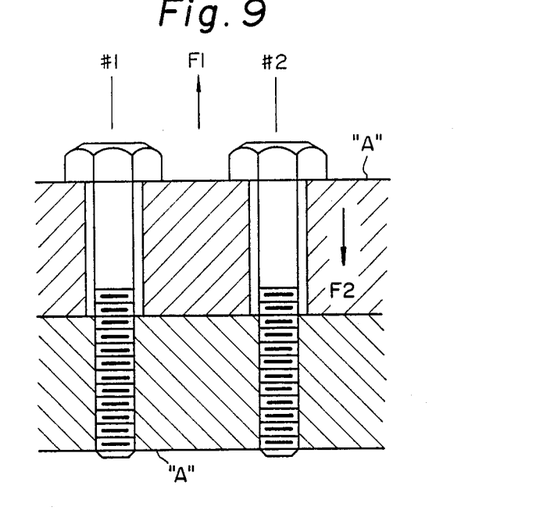
FIG. 9 is a side view including a section explanatory of mutual states of tightening screws.
Figure 10:
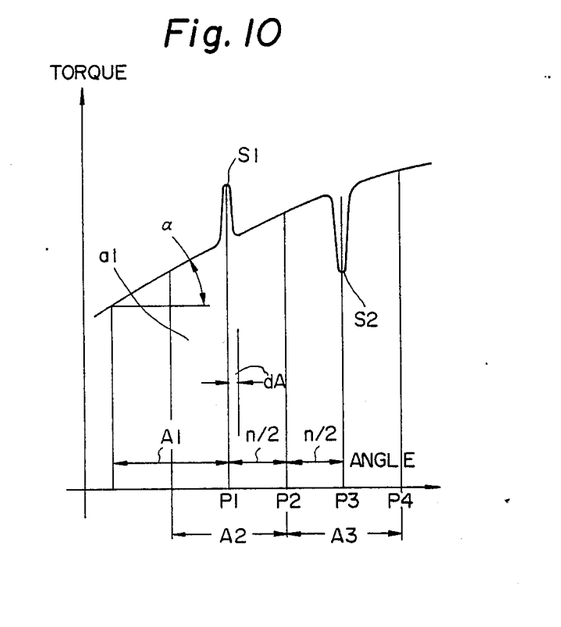
FIG. 10 is a graph of a torque/angle curve explanatory of a result of tightening screws in the state shown in FIG. 9.

To clearly explaing this influence, an example of tightening two screws is shown in FIG. 9. During the tightening of a screw #1 the other screw #2 is subjected to an upward or downward external force "F1" or "F2" due to the unparallel contact surfaces of a member "A" to be fastened. The external force "F1" applied to the screw produces a positive spike-like torque locus "S1" and the external force "F2" produces a negative spike-like torque locus "S2" as shown in FIG. 10. During the actual tightening process proceeding from the point "P1" to the point "P2" while performing the calculation for each minimum unit "dA" of the tightening angle, the spike-shaped torque locus "S1" stays in the right-hand half portion "a1" of a calculation region "A1". Accordingly, the area of the portion "a1" containing the spike-shaped torque locus "S1" is large. Since the torque rate is obtained by subtracting the area of the left-hand half portion from the area of the right-hand half portion, the calculated torque rate "$\alpha$" is larger than in a case where the spike-shaped torque locus is not contained. On the other hand, in the actual tightening process from the point "P2" to the point "P3" the spike-shaped torque locus "S1" lies in the left-hand half portion of a calculation region "A2", so that the calculated torque rate "$\alpha$" is apparently small. Also in the actual tightening process from the point "P3" to the point "P4", the negative spike-shaped torque locus "S2" lies in the left-hand half portion of a calculation region "A3", and accordingly the calculated torque rate "$\alpha$" is apparently small. In such a case, if the values of the spike-shaped torque loci "S1" and "S2" are large, the calculated torque rate "$\alpha$" will become smaller than the preset target torque rate, leading to such a misjudgement as if the yield point has been reached.

Such a misjudgement can be avoided by making a rule that the judgement on the yield point is not regarded as valid unless the judgement has been passed in succession a plurality of times more than $\frac{1}{2}$ the number of data to be calculated. This is the object of the fourth requirement of the present invention.

Figure 11:
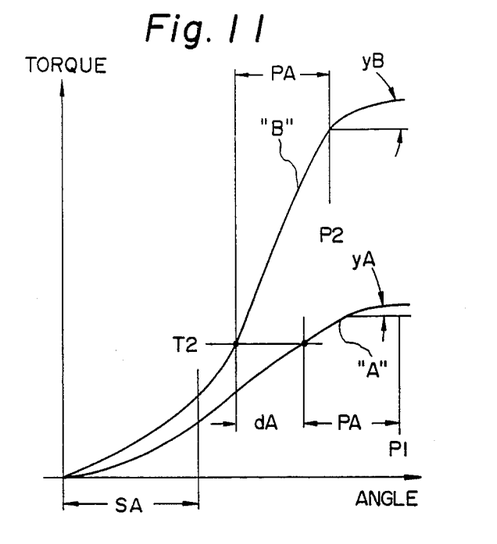
FIG. 11 is a graph which illustrates tightening torque curves of two screws in the same application by prior art.
Figure 12:
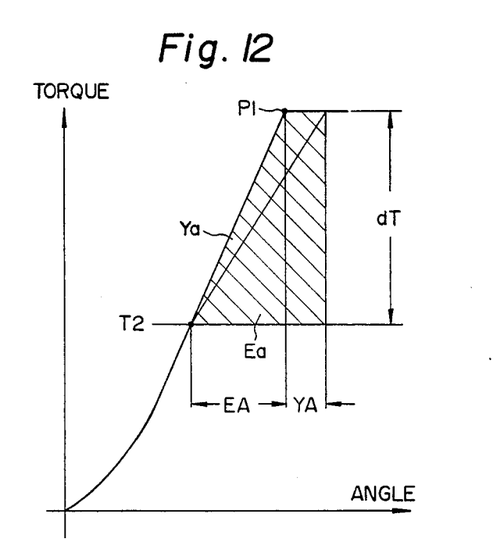
FIG. 12 is a graph of a torque/angle curve obtained in accordance with the present invention for the same application enclosed with reference to FIG. 11.

Finally, the fifth requirement of the present invention will be described in detail. FIG. 11 shows tightening torque curves of two screws in the same application. Even if the screws are identical in shape and used for fastening the same member, a difference between their inherent coefficients of friction makes a large difference in the shape of the torque curve. When individual yield torque rates "yA" and "yB" of the two torque curves "A" and "B" in FIG. 11 are greater than a certain value, it is misjudged that the yield points have not been reached. To avoid this, it is customary in the art to put the actual tightening process to an emergency stop at a point "P1" or "P2" if no yield point can be detected even after the actual tightening torque has reached a preset torque level "T2" and passed through a preset angle limit "PA". In FIG. 11 a region "SA" indicates the state in which the screw and the member to be fastened have not yet been completely clamped together. Further, in a region where the actual tightening torque is relatively small, the torque curve is often complex in locus, as shown in FIG. 6. Accordingly, it is necessary that the value of the preset torque "T2", at which the tightening angle measurement starts, be as large as possible. This means that the start point of the preset angle limit "PA" in each of the torque curves "A" and "B" has an error of an angle "dA:; namely, the emergency stop point "P1" for the torque curve "A" is set well after the yield point, but the emergency stop point "P2" for the torque curve "B" is set before the yield point. The fifth requirement of the present invention is intended as a solution to this problem. Now, the principle of this requirement will be described in connection with FIG. 12. The integration of the area of the hatched portion starts at the time point when the actual tightening torque has exceeded the preset torque level "T2". At the same time, the area of a triangle inscribed in the hatched portion is calculated and a difference "Ya" between the hatched portion and the triangle is obtained.

$$Ya = [(EA \cdot dT/2) + YA \cdot dT] - dT(EA + YA)/2 \quad (5)$$
$$= (EA \cdot dT/2) - YA \cdot dT - (EA \cdot dT/2) - (YA \cdot dT/2).$$

Hence, $Ya = YA \cdot dT/2$

In the above, "YA" is an angle starts at the yield point "P1". Assuming that the angle "YA" is the preset target angle, the tightening process is stopped at a preset target yield angle if it is stopped when the angle "YA" has satisfied the condition of the following quation (6). Therefore, $$Ya \geqq YA \cdot dT/2 \quad (6)$$

With this method, the tightening process can surely be stopped at a preset angle regardless of the actual tightening torque rate, whatever value it may have.

The five requirements described above are indispensable to perfect yield tightening in the actual tightening process, and form the basis of the present invention.

The screw tightening process is a final step in an assembly line, in which perfect quality control is required. Therefore, quality control must be effected not only for screw tightening but also for all items of the clamped member. In other words, quality control of screw tightening alone does not mean quality control of the whole screw tightening process.

As described in detail previously, there is present in the actual tightening process such a tightening torque curve as shown in FIG. 6. If only the yield tightening is taken into account, the purpose can be achieved simply by setting at as high as position as possible the start point "T2" for the detection of the yield point. For quality control of the whole screw tightening process, however, the torque locus in the range between the actual torque curves "T1" and "T2" cannot be ignored. When the portion "B" is long, it means that the surface roughnesses of the contact surfaces are poor or a foreign substance is held between them. In this case, the yield point can be detected by measuring the actual angle "A", with the start points "T1" and "T2" used as preset torque limits, and determining whether the angle "A" is larger than the preset angle limit. When the actual angle "A" is abnormally small, the machining tolerance of screw threads or threads of the tap hole is low or the tap hole is filled with foreign substances or cross-threaded. With this method, not only the actual angle "A" but also the actual torque rate can be employed.

The method, in which it is determined whether the actual tightening torque and the actual tightening angle still remain in the acceptable area or green area at the end of the actual tightening process, is not suitable for monitoring an erroneous detection of the yield point, as referred to previously, but this method is very effective for monitoring the whole screw tightening process.

The acceptable area is, for example, the hatched portion defined by the high torque limit "HT", the low torque limit "LT", the high angle limit "HA" and the low angle limit "LA" in FIG. 6. When the tightening process is satisfactory in all respects, the end point of the actual torque curve lies in this acceptable area.

The actual final torque larger than the limit "HT" indicates that the coefficient of friction in tightening exceeds a reference value, and the actual final torque lower than the limit "LT" means that the bolt tension is below the reference value. When the actual final angle is greater than the limit "HA", it means damaged threads or the occurrence of an abnormal depression in the contact surfaces, and when the actual angle is smaller than the limit "LA", it means a decrease in the stress of the screw due to its cracking or the occurrence of excessive galling in the contact surfaces.

Besides, an over time limit is also important as a measure for monitoring the whole screw tightening process. In screw tightening there are cases where no screws are supplied, where different kinds of screws are supplied, where screw threads and threads of the mating tap hole do not mesh with each other, and where a wrench and the screw head do not mesh with each other. In these cases, the tightening torque will never be yielded, and consequently the point "T1" in FIG. 6 at which the tightening starts will never be reached. This can be detected by setting the above-mentioned over time limit.

Figure 13:
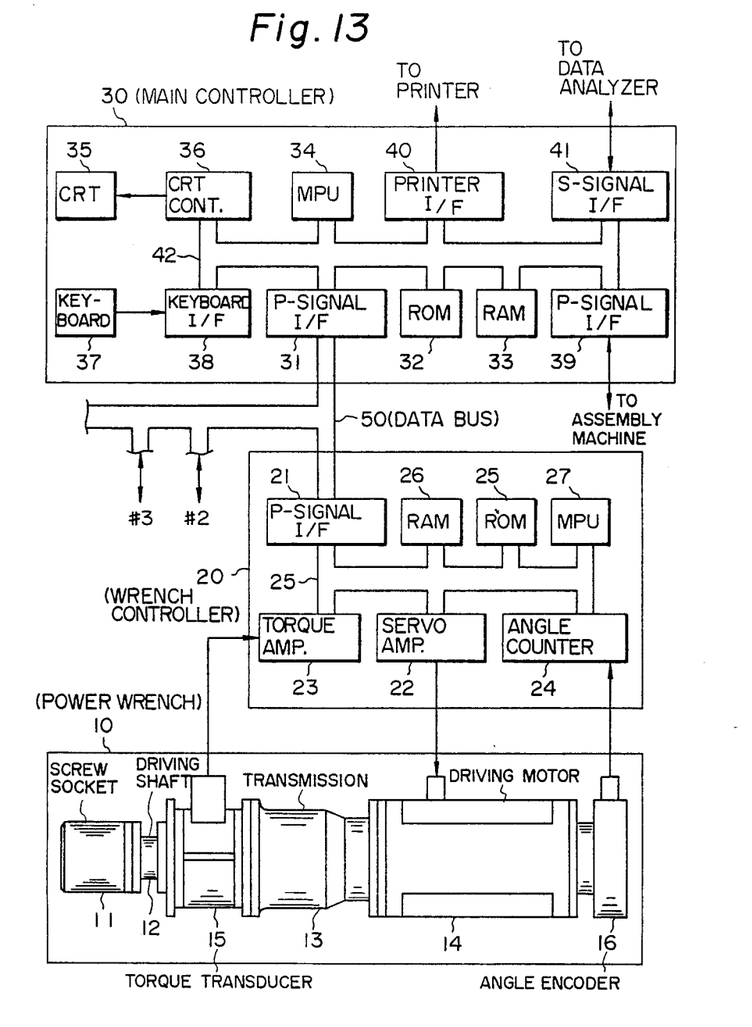
FIG. 13 is a block diagram illustrating and example of an apparatus for performing the method of the present invention.

Turning now to FIG. 13, an embodiment of the present invention will be described.

The tightening system comprises, in general, a power wrench 10, a wrench controller 20 and a main controller 30. The power wrench 10 and the wrench controller 20 form a pair, and in case of the multiple tightening application, a required number of such pairs are prepared and are connected via a data bus 50 to the main controller 30. For instance, in case of two spindles, a second wrench controller is connected at a position #2 of the data bus 50, and in case of three spindles, wrench controllers are connected at both positions #2 and #3, respectively. This embodiment is designed so that a maximum 16 spindles can be connected to the main controller 30. The data bus 50 is connected to a parallel signal I/F (a parallel signal interface) 21 of each wrench controller and a parallel signal I/F (a parallel signal interface) 31 of the main controller 30, for transferring therethrough various preset data and commands necessary for screw tightening and various tightening data and judgement data generated by the wrench controller 20.

The power wrench 10 comprises a screw socket 11 for engagement with the screw head to apply a tightening torque, a driving shaft 12 for driving the screw socket 11, a transmission 13 for amplifying the torque of a driving motor 14 and transmitting it to the driving shaft 12, a driving motor 14 for converting an electric signal from a servo amplifier 22 of the wrench controller 20 into the torque, a torque transducer 15 for converting the reaction moment of the tightening torque into an electric signal and applying it to a torque amplifier 23 of the wrench controller 20, and an angle encoder 16 for detecting the rotational angle of the screw, converting it into a pulse-shaped electric signal and providing it to an angle counter 24 of the wrench controller 20.

The wrench controller 20 comprises a parallel signal I/F (a parallel signal interface) 21 for transmitting and receiving therethrough all data necessary for tightening and all data obtained by tightening, a servo amplifier 22 for converting data from the data bus 25 into an electric signal necessary for rotating the driving motor 14, a torque amplifier 23 for amplifying the analog signal from the torque transducer 15 and converting it into a digital signal, an angle counter 24 for integrating and storing the pulse signal from the angle encoder 16, a ROM (a read only memory) 25 for storing all sequences necessary for this unit in the tightening process, a RAM (a random access memory) 26 for storing all preset data necessary for this unit and all data obtained in this unit during the tightening process, and a MPU (a microprocessor) 27 for performing all operations necessary for this unit in the tightening process and controlling the wrench controller 20. These elements are interconnected via an internal bus 25.

The main controller 30 comprises a parallel signal I/F (a parallel signal interface) 31 by which all data and commands necessary for the tightening process and all data obtained by the tightening process are transmitted to and received from a plurality of wrench controllers 20 via the data bus 50, a ROM (a read only memory) 32 for storing all sequences necessary for the tightening process, a RAM (a random access memory) 33 for storing all data necessary for the tightening process and all data obtained during the tightening process, a MPU (a microprocessor) 34 for performing all operations necessary for the whole tightening process, a CRT display 35 for displaying all data necessary for the whole tightening process and all data obtained during the tightening process, a CRT controller 36 for providing display data to the CRT display 35, a keyboard 37 for inputting all data necessary for the whole tightening process, a keyboard interface 38 for receiving the data input from the keyboard 37, a parallel signal I/F (a parallel signal interface) 39 through which interlock signals are transmitted to and received from an assembly machine in which this tightening system is incorporated, a printer I/F (a printer interface) 40 for transferring to a printer all data necessary for the tightening process and all data obtained during the tightening process, a serial signal I/F (a serial signal interface) 41 transferring to a data analyzer all data necessary for the tightening process and all data obtained during the tightening process, and a data bus 42 for interconnecting these devices. The storage area of the RAM 33 is divided into two, and the storage area for storing all data necessary for the tightening process is backed up by a battery for preventing the loss of the stored data in case of power failure.

Next, the operation of this tightening system will be described.

All data necessary for the tightening process, stored in the RAM 26 of each wrench controller 20, are automatically updated when power is connected and when the data is rewritten throught the keyboard 37.

Upon generation of a tightening process start signal from the assembly machine, the signal is provided to the MPU 34 of the main controller 30 via the parallel signal I/F 39 and the data bus 42. The MPU 34 makes a self-diagnosis of each device of the main controller 30 and, at the same time, sends a diagnosis command to each wrench controller 20 via the data bus 42, the parallel I/F 31 and the data bus 50. Each wrench controller 20 responds to the command to perform the self-diagnosis and, at the same time, diagnosis main functions of the power wrench 10 connected thereto.

The above-said self-diagnosis is essential to quality control of screw tightening, because reliable quality control is possible only when all functions for tightening are normal.

After confirming that the results of all the self-diagnosis are good, the MPU 34 of the main controller 30 sends a tightening start signal to each wrench controller 20.

Figure 14:
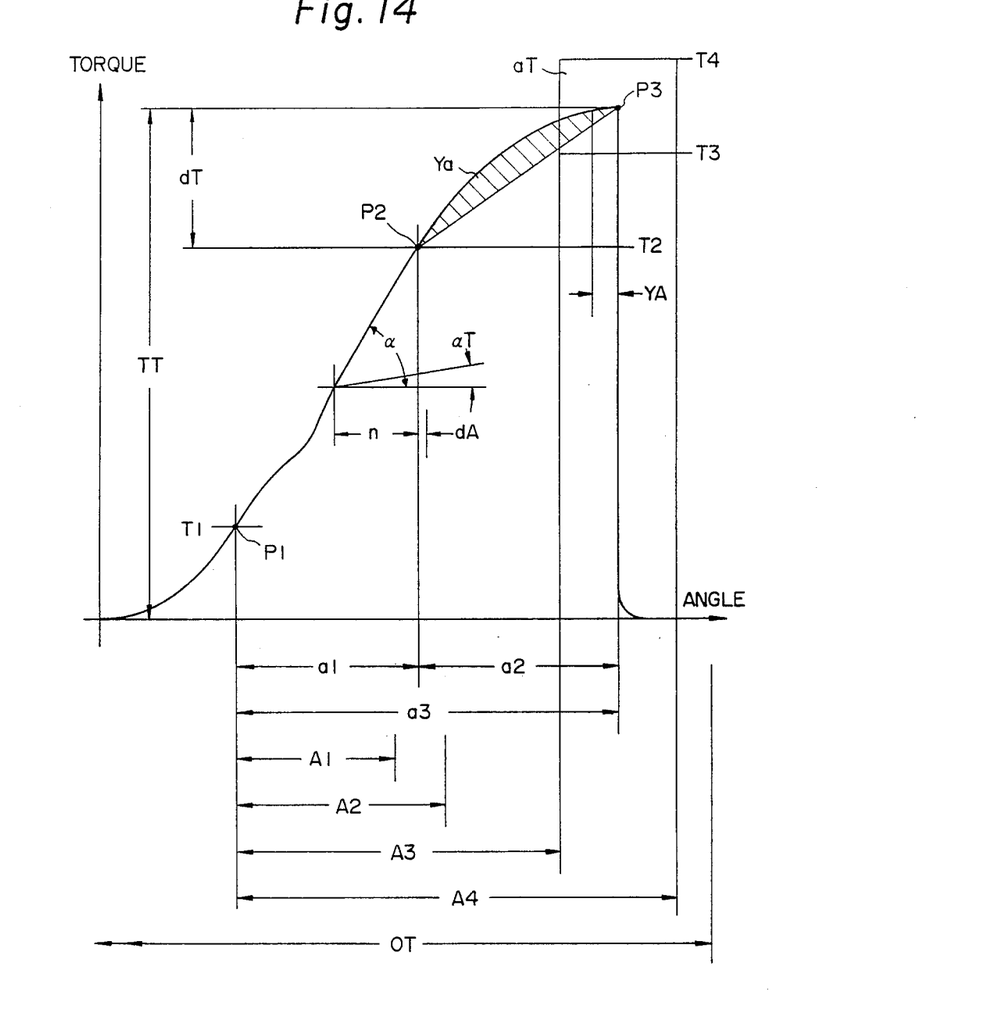
FIG. 14 is a graph of a characteristic curve explanatory of a screw tightening process carried out by the use of the apparatus shown in FIG. 13.

Turning next to FIG. 14, the actual tightening process will be described in detail.

At the same time as each wrench controller 20 starts the power wrench 10, the MPU 27 of the wrench controller 20 starts to measure the tightening time and compares it with a preset over time limit "OT" at all times. If the actual tightening process is not completed within the preset over time limit, then the MPU 27 sends an abnormality signal via the parallel signal I/F 21 to the main controller 30.

In FIG. 14, references "P1" and "P2" indicate first and second actual tightening points and a reference "P3" a final tightening point. A reference "a1" indicates an actual tightening angle from the point "P1" to "P2", "a2" an actual tightening angle from the point "P2" to the point "P3", "a3" the sum of the tightening angles "a1" and "a2", and "α" an actual average torque rate calculated using n pieces of data. References "A1", "A2", "A3" and "A4" designate first, second, third and fourth tightening angle limits, "YA" a yield target angle limit, "αT" a target yield rate limit, "n" the total number of torque data necessary for calculating the actual average torque rate "α", and "T1", "T2", "T3" and "T4" first, second, third and fourth torque limits, which are all preset values input from the keyboard 37 of the main controller 30. When input from the keyboard 37, these data are displayed on the CRT display 35 and, at the same time, they are once stored in the battery-backed-up storage area of the RAM 33 and then transferred to the RAM 26.

These data can be input via the serial signal I/F 41 from the data analyzer of an external device as well.

When the actual tightening torque has reached the point "P1" where it is equal to the first torque limit "T1", the angle counter 24 starts measuring the actual tightening angle. When the actual tightening torque has reached the point "P2" where it is equal to the second torque limit "T2", the MPU 27 determines whether or not the actual tightening angle "a1" stays in the range beteen the first and second tightening angles, if not, it is judged that an abnormality has occurred, and an abnormality signal is sent to the MPU 34. The MPU 34 jumps to a subroutine for processing the abnormality and provides to the MPU 27 an execution instruction for the abnormality processing. Usually this instruction is programmed so that when the actual tightening angle "a1" is smaller than the first tightening angle limit "A1", the tightening process is brought up to an emergency stop in recognition of the emergency condition that screw threads or threads of the tap hole have been damaged, cross threading has occurred, or the tap hole has been filled with a foreign matter. When the actual tightening angle "a1" is larger than the first tightening angle limit "A1", the screw is turned back for re-tightening in recognition of the condition that contact surfaces of members to be fastened together are unparallel or low in surface roughness. It is a matter of course, however, that the program of this subroutine can easily be modified as required.

After the actual tightening process has reached the point "P2", the MPU 27 begins to calculate the actual average torque rate "α" on the basis of the afore-mentioned equation (3) using the stored torque data corresponding to the number "n" of preset data, and compares the calculated torque rate "α" with the target yield rate limit "αT". In this calculating and comparing operation, after the actual tightening process has proceeded a very small angle dA from the point "P2" in FIG. 14, the calculation of the actual average torque rate "α" is performed always using "n" pieces of torque data, omitting the oldest torque data each time new torque data is obtained, and the calculated torque rate "α" is compared with the target yield rate limit "αT", and when the former becomes smaller than the latter, the tightening process is stopped. This condition for stopping the tightening process will hereinafter be referred to as a condition 1. Similarly, after the actual tightening process has proceeded the very small angle dA from the point "P2" in FIG. 14, the MPU 27 calculates the difference "dT" between the actual tightening torque "TT" and the preset torque "T2", integrates the difference upon each increase in the tightening angle, and substracts from the integrated value the area of a right triangle to obtain the area "Ya". When the area "Ya" has come to satisfy the condition of equation (6) which is a conditional equation which is calculated using the preset target yield angle "YA", the MPU 27 stops the tightening process. This condition for stopping the tightening process will hereinafter be referred to as a condition 2.

Information as to whether the tightening process has been stopped under the condition 1 or 2 is applied from the MPU 27 to the MPU 34. According to a preset rule, the MPU 34 provides the information via the data bus 42 and the CRT controller 36 to the CRT display 35 for display thereon, to the printer via the printer I/F 40, to the data analyzer via the serial signal I/F 41, and to the assembly machine via the parallel signal I/F 39.

Usually, the tightening process is judged to be acceptable or unacceptable depending on whether the process has been stopped under the condition 1 or 2, but the program can easily be changed so that the tightening process is acceptable in the both cases.

After the actual tightening process has reached the point "P2", the MPU 27 always judges whether or not the actual torque curve meets with the condition 1 or 2 and whether or not the actual tightening torque "TT" passes the preset torque limit "T4". Where the actual tightening torque "TT" oversteps the limit "T4", the MPU 24 immediately stops the tightening process and provides the information to the MPU 34.

The MPU 34, when supplied with the information on these abnormalities of a spindle, is capable of stopping the abnormal spindle together with other normal spindles or allowing the tightening process of the normal spindles to proceed. These operations are determined entirely by the contents of the program used.

Immediately when the tightening process is stopped under the condition 1 or 2, the MPU 27 judges whether or not the final tightening torque "TT" is smaller than the preset torque limit "T3" and whether or not the final tightening angle "a3" is smaller than the preset angle limit "A3", and sends the information to the MPU 34. If these actual tightening values are smaller than the preset values, then the MPU 34 will operate on a programmed rule. There are many methods for the operation and can also be selected by changing the contents of the program.

All data obtained during the actual tightening process is once stored in the RAM 26 and, upon completion of the tightening process, they are transferred to the RAM 33. These data are the tightening angle "a1" between the preset torque limits "T1" and "T2", the final tightening angle "a3", the final tightening torque "TT", the final average torque rate "α", and so forth. In case of multiple spindle tightening, tightening data of all spindles are stored in the RAM 33 and the MPU 34 displays the data on the CRT display 35, transfers the data to the printer or data analyzer, and sends a judgement signal to the assembly machine. Where the data analyzer has a function of analyzing the actual tightening condition through utilization of the supplied data, preparing data for appropriate tightening and providing the data to the tightening system, the MPU 34 stores the data in the battery-backed-up storage area of the RAM 33, as is the case with the data input from the keyboard 37. The data thus stored in the RAM 33 is transferred to each wrench controller 20 for performing an appropriate tightening process.

The quality control method of the present invention for yield tightening is implemented by the system shown in FIG. 13, and various calculating processes and various judgement functions necessary for the present invention are implemented by making utmost use of the function of the imcroprocessor.

What I claim is:

1. A method for yield tightening of screws by use of a wrench including a device for detecting a tightening torque, a device for converting a tightening angle and an electric motor for generating a screwing torque, and a controller including a device for receiving electric signals corresponding to the tightening torque and the tightening angle, a device for driving the electric motor, a read only memory for storing sequences necessary for a tightening process, a calculating step and a judgement step, a random access memory for storing present data necessary for the tightening process and data obtained during the tightening process, a microprocessor for performing calculations and judgements necessary for the tightening process, a device for displaying the various data and a device for transmission and reception of a judgement signal and various data between the controller and external systems, the method comprising:

a step wherein after an actual tightening torque passes a certain preset torque limit, "n" (equal to or more than 4) pieces of actual torque data stored in a preset means are integrated by two integration stages and an average torque rate is calculated on the basis of a difference between the respective integrated values by the two stages;

a step wherein it is recognized that an actual torque curve has reached a yield area when it is determined that the average torque rate is smaller than a preset target torque rate;

a step wherein the tightening process is stopped immediately when the said recognition has been given in succession a plurality of times greater in number than ¼ of the number "n";

a step wherein when the tightening process proceeds to a condition in which the next new data is provided, the oldest piece of data is removed from a routine of calculating the average torque rate and a new piece of data is added to the routine, the calculation being performed in succession updating the data to be calculated until the tightening process is stopped; and a step wherein after the actual tightening torque reaches the torque limit, an integrated value is calculated by subtracting the torque limit from the actual tightening torque, the area of a right triangle inscribed in the area of the integrated value is calculated, a difference value between the integrated value and the area of the right triangle is calculated, and when the difference value is larger than an area calculated by the use of a present target angle limit, the tightening process is immediately stopped.

2. A method for yield tightening of screws according to claim 1, further comprising a step wherein immediately prior to or at the beginning of the rotation of the wrench by a start signal from an external device it is judged whether the tightening process can be performed normally or not, and if not, a display of an abnormal condition is provided and an abnormality signal is provided to the external device.

3. A method for yield tightening of screws according to claim 1, further comprising a step wherein when the respective steps are not completed within a time limit preset in the preset means, the tightening process is immediately stopped, a display of an abnormal condition is provided and an abnormality signal is provided to an external device.

4. A method for yield tightening of screws according to claim 1, further comprising a step wherein it is judged whether or not a tightening angle is in a range defined by two preset angle limits, and when the tightening angle is within the range, the tightening process is allowed to proceed, but when the tightening angle is not within the range, the tightening process is immediately stopped, a display of an abnormal condition is provided and an abnormality signal is provided to an external device, or the wrench is turned back for re-tightening.

5. A method for yield tightening of screws according to claim 1, further comprising a step wherein when the actual tightening torque or angle passes a preset high torque or angle limit in the tightening process, the tightening process is immediately stopped, a display of an abnormal condition is provided and an abnormality signal is provided to an external device.

6. A method for yield tightening of screws according to claim 1, further comprising a step wherein when the actual tightening torque or angle is below a preset low torque or angle limit when the tightening process is stopped, a display of an abnormal condition is provided and an abnormality signal is provided to an external device.

7. A method for yield tightening of screws according to claim 1, further comprising a step wherein when the tightening process is stopped in either of the two tightening process stopping steps, a result of judgement recognizing that the stoppage of the tightening process is normal is displayed and a corresponding judgement signal is provided to an external device, or when the tightening process is stopped in the second one of the tightening process stopping steps, a result of a judgement recognizing that the stoppage of the tightening process is abnormal is displayed, and a step wherein either one of the two tightening process stopping steps can be selected as desired.

8. A method for yield tightening of screws according to claim 1, further comprising a step wherein the tightening process is performed on the basis of various data necessary for tightening and a rule necessary for the tightening process and various data obtained during the tightening process are displayed and sent to an external device in accordance with the rule.

* * * * *